March 9, 1965  A. R. THOMPSON  3,173,119
METHOD OF MAKING AND ADJUSTING TRANSDUCER
Filed April 24, 1962

INVENTOR.
ALLAN R. THOMPSON
BY
RICHEY, McNENNY & FARRINGTON
William J. Flynn
ATTORNEYS

3,173,119
METHOD OF MAKING AND ADJUSTING TRANSDUCER

Allan R. Thompson, Westlake, Ohio, assignor to Clevite Corporation, a corporation of Ohio
Filed Apr. 24, 1962, Ser. No. 189,763
3 Claims. (Cl. 336—133)

This invention relates to a transducer or measuring device, and to a magnetic core structure for use therein, and to a method of making the same.

In United States Letters Patent Nos. 2,631,272, 2,697,214, 2,700,758 and 2,981,909, there have been disclosed various embodiments of a measuring device or transducer which produces an electrical signal whose magnitude is a measure of the displacement of a movable element from a predetermined null position. The measuring device includes a ferromagnetic core providing two different paths for magnetic flux and a portion common to both flux path, an air gap at said common portion, primary winding means on said core, secondary winding means having two different portions on the core at said two different flux paths and connected in series opposition, and a flux barrier movable in the air gap to control the division of flux between the two different flux paths in the core. The flux barrier preferably is in the form of a shorted turn or loop of electrically conductive, non-magnetic material. When a suitable A.C. excitation signal is applied to the primary winding means, the net output voltage appearing across the secondary winding means is a measure of the displacement of the flux barrier from a predetermined null position in the air gap in which the voltage induced across the two different portions of the secondary winding means cancel each other.

One of the problems associated with such transducers has been the existence of an undesirable, residual output signal caused by a difference between the respective eddy currents in the two different flux paths through the core. When these eddy currents are unequal there is produced a residual signal which is 90 degrees out of phase with the differential output voltage of the transducer (i.e., the net voltage induced across the secondary winding due to the flux induced in the core by the excitation signal applied to the primary winding). This residual quadrature signal has been found to be present in such transducers even when the differential output voltage was substantially zero (i.e., when the flux barrier was in its null position). In practice, this residual quadrature voltage has had a magnitude of between 0.1% and 1.0% of the maximum differential output voltage of the transducer. To "buck out" this residual quadrature signal it has been the practice to provide adjustable magnetic slugs on the transducer or additional circuitry external to the transducer.

In accordance with the present invention there is provided a novel core structure for transducers of this general type which enables this residual quadrature signal to be reduced to a negligible value without the necessity of any additional correction devices external to the transducer.

Another aspect of the present invention is concerned with reducing the cost of such transducers.

Prior to the present invention the core of the transducer was constructed of metal laminations which contributed appreciably to its overall cost. In accordance with the preferred embodiment of the present invention, the core is composed of two high permeability ferrite members, which together provide the complete core structure for the transducer. The use of this novel ferrite core structure enables a significant reduction in the cost of the measuring device without, however, detracting significantly from its accuracy.

It is an object of this invention to provide a position-responsive transducer having a novel and improved magnetic core.

It is also an object of this invention to provide a position-responsive transducer having such a core which enables the residual quadrature signal to be reduced to a negligible value.

Also, it is an object of this invention to provide a novel and improved method of making such a transducer.

Further objects and advantages of this invention will be apparent from the following detailed description of two presently-preferred embodiments thereof, which are illustrated in the accompanying drawing:

In the drawing:

FIGURE 1 is an exploded perspective view showing the ferrite "I" and E core pieces from which the present magnetic core structure is assembled;

Figure 2:
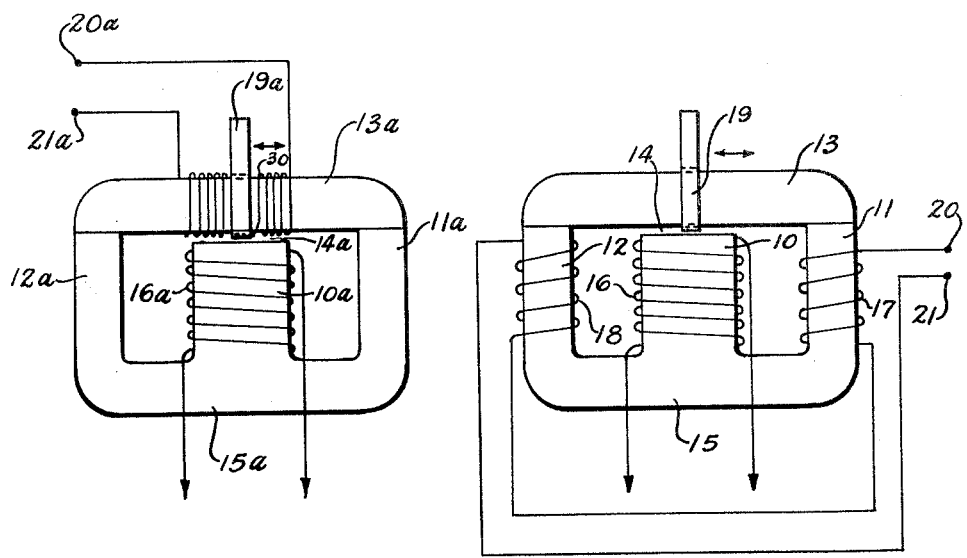
FIGURE 2 shows one form of transducer embodying the present magnetic core structure.

Referring first to FIGURE 2, the measuring device or transducer illustrated schematically therein is of the same general type as those disclosed in U.S. Patents 2,631,272, 2,697,214, 2,700,758 and 2,981,909. It includes a ferromagnetic core having a center leg 10 and a pair of outer legs 11 and 12 on opposite sides of the center leg. At its upper end in FIGURE 2, the core has a top leg 13 joining the upper ends of both of the outer legs 11 and 12 and spaced from the upper end of the center leg by an air gap 14. At its lower end in FIGURE 2 the core has a bottom leg 15 joining the lower ends of both outer legs 11 and 12 to the lower end of the center leg 10. A primary winding 16 is wound around the center leg 10 of the core. A secondary winding is provided, having two different portions 17 and 18 which are wound individually around the respective outer legs 11 and 12 of the core. The secondary winding portions 17 and 18 are connected in series bucking relationship.

A movable flux barrier member 19 is disposed in the air gap 14. Preferably this flux barrier member is a shorted turn or loop of electrically conductive, non-magnetic material, such as copper or brass, extending loosely around the top core leg 13 and freely slidable lengthwise of the air gap, i.e., in a direction toward one or the other of the outer core legs.

The two outer legs 11 and 12 and the respective adjoining portions of the bottom leg 15 provide two different paths for magnetic flux in the core, while the center leg 10 is common to both of these flux paths. The opposite halves of the top leg 13 complete these two different flux paths through the core from the respective outer legs 11 and 12 back to the center leg 10 across the air gap 14.

In the operation of this measuring device, when a suitable alternating current signal is applied to the primary winding 16, alternating magnetic flux is induced in the center leg 10 of the core, flowing across the air gap 14 and dividing there, part going to the outer core leg 11 and the remainder going to the outer core leg 12 before returning via the bottom core leg 15 to the lower end of the center core leg 10. The flux in each outer core leg 11 or 12 induces a voltage in the corresponding secondary winding portion 17 or 18. Since these portions of the secondary winding are connected in series opposition, the net voltage across the secondary output terminals 20 and 21 is the difference between the individual voltages across the respective portions 17 and 18 of the secondary winding.

The flux barrier member 19 tends to prevent any change in the flux linkages through itself. Therefore, it acts to prevent the flow of any appreciable amount of alternating flux through the top leg 13 of the core at the position of the flux barrier member. Accordingly, the position of the flux barrier member 19 along the air gap 14 determines the division of flux between the outer legs 11 and 12 of the core, and thus the respective magnitudes of the voltages induced across the respective portions 17 and 18 of the secondary winding.

When the flux barrier member 19 is centered mid-way along the air gap 14, the flux will divide equally between the respective outer legs 11 and 12 of the core. If, for example, the respective secondary windings are identical, then the voltages induced across them will be equal in the centered position of the flux barrier member, and since the secondary windings are connected in series bucking relationship the net output voltage will be zero.

When the flux barrier member 19 is positioned to one side or the other of this centered position, the flux across the air gap 14 will divide between the respective outer core legs 11 and 12 in proportion to the displacement of the flux barrier member from its centered position. Consequently, in the particular example where the secondary windings are identical, the voltage induced across one of the secondary winding portions will be greater than the voltage induced across the other secondary winding portion, so that some finite net voltage is produced across the output terminals 20 and 21. The phase of this net voltage indicates the direction of the off-center position of the flux barrier member 19. The magnitude of this net voltage is proportional to the displacement of the flux barrier member from its centered position.

In accordance with the preferred embodiment of the present invention, the ferromagnetic core is made up of two ferrite pieces, each of which has a thickness equal to the complete thickness of the finished core structure. Referring to FIGURE 1, one of these pieces, A, which makes up the entire top leg 13 of the core in FIGURE 2, is a ferrite "I" core which is a standard item of commerce. To start with, the other core piece, B is a ferrite E core, which also is a standard item of commerce sold for use in high frequency transformers or inductors. As sold, the E core has a center leg 10' of the same length as the outer legs 11' and 12'.

In accordance with the present invention, sufficient material of the upper end of the center leg 10' is first removed, such as by grinding, to provide the air gap 14 between the center leg and the top leg in the assembled core structure, as shown in FIGURE 2. After the center leg 10' of the E core has been shortened in this manner, the two core pieces are brought together as shown in FIGURE 2, with the "I" core piece abutting against the ends of the outer legs on the E core piece. Because of the fact that there are only two core pieces involved, the assembly of the complete core structure may be carried out more quickly and less expensively than is possible where the core is composed of a multiplicity of thin plates which must be assembled together.

The primary and secondary windings preferably are applied to the respective legs of the E core piece before the "I" and E core pieces are assembled together. Also, the flux barrier 19 is applied to the "I" core piece before the core pieces are assembled together.

By virtue of the novel two-piece construction of the core it may be adjusted to substantially eliminate the residual quadrature signal, which is due to an inequality between the respective eddy currents in the two different flux paths in the core.

This is done by positioning the flux barrier in its null position and observing the magnitude of the quadrature signal. Preferably, this is done by means of an oscilloscope. The "I" core piece then is adjusted one way or the other lengthwise of the air gap 14 and parallel to the direction in which the flux barrier 19 is movable. (Such adjustment of the "I" core piece requires that the flux barrier 19 be set in a new null position, in which the true output voltage is as close as possible to zero, as observed on an oscilloscope.) In some particular position of the "I" core piece the eddy currents in the two different flux paths in the core will be substantially equal and therefore the net quadrature signal will be substantially zero. In practice, it has been found that by so adjusting the "I" core piece the quadrature signal may be kept as low as between .01% to .001% of the full scale output voltage of the transducer without the need for any correction devices external to the transducer.

After the optimum position of the "I" core piece has been determined, the two core pieces are secured in place by means of a clamp or by "potting" them in a suitable compound.

Preferably, as described, both pieces which make up the core structure are of ceramic-like ferrite material having high magnetic permeability, low hysteresis losses, and high electrical resistivity. For example, the ferrite material may be manganese zinc ferrite, having the approximate formula $Mn_{0.5}Zn_{0.5}Fe_2O_4$, or nickel zinc ferrite, having the approximate formula $Ni_{0.5}Zn_{0.5}Fe_2O_4$.

However, the balancing of the eddy currents in the two different flux paths through the core can be achieved also if the "I" and E core pieces are each composed of laminations which are cemented or otherwise secured together, instead of ferrite pieces.

Figure 3:
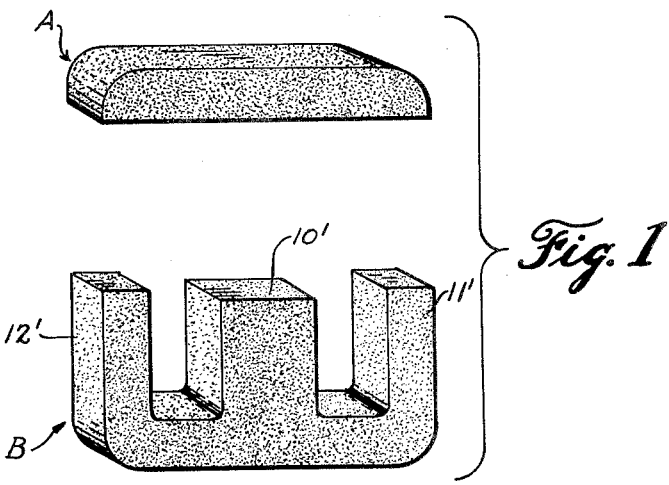
FIGURE 3 is a similar view showing a second form of transducer embodying the present magnetic core structure.

FIGURE 3 illustrates an alternative embodiment of the measuring device which includes the present core structure. The core itself is identical in construction and mode of assembly to that described with reference to FIGURES 1 and 2. Corresponding elements are given the same reference numerals as in FIGURE 2, with a subscript $a$ added. The only difference in the FIGURE 3 device, as compared with the device of FIGURE 2, is that the secondary consists of a single closely wound multi-turn winding 30 on the top leg 13a of the core at the air gap 14. The flux barrier member 19a encircles this secondary winding and is freely slidable along the air gap. It will be apparent that the respective portions of the secondary winding 30 which are on opposite sides of the flux barrier member 19a are at the two different flux paths in the core. As in the embodiment of FIGURE 2, the position of the flux barrier member 19a along the air gap 14a determines the voltage appearing across the secondary output terminals 20a and 21a.

While presently-preferred embodiments of the present invention have been shown and described, it is to be understood that modifications which depart from the specific disclosed embodiments may be adopted without departing from the spirit and scope of this invention.

What is claimed is:

1. A method of making a transducer which comprises the steps of providing a first magnetic core piece having two different magnetic portions which provide two different flux paths and a portion common to both flux paths, positioning a second magnetic core piece extending from one of said two different magnetic portions to the other and spaced from said common portion by an air gap, said second core piece completing both said two flux paths from said two different magnetic portions of the first core piece to said common portion across said air gap, providing primary winding means on the core, providing on the core a secondary winding having two different portions at said two different flux paths connected in series opposition, positioning a movable flux barrier in said air gap, energizing said primary winding means, adjusting the position of said core pieces with respect to one another to substantially equalize eddy currents in said two different flux paths, and securing said core pieces in said adjusted position.

2. A method of making a transducer which comprises the steps of providing a first generally E-shaped magnetic core piece having a center leg and two outer legs disposed on opposite sides of said center leg which provide two different flux paths, positioning a second magnetic core piece in abutting engagement with the free ends of both said outer legs and spaced from the free end of said center leg by an air gap, said second core piece completing both said two flux paths from said outer legs back to said center leg across said air gap, providing a primary winding on said center leg, providing on the core a secondary winding having two different portions at said two different flux paths connected in series opposition, positioning a flux barrier in said air gap at a null position therealong in which the respective voltages induced across said two different portions of said secondary winding are substantially equal when said primary winding is energized, adjusting the position of said second core piece transverse to said outer legs to substantially equalize eddy currents in said two flux paths when said primary winding is energized, and securing said second core piece in said adjusted position.

3. A method of making a transducer which comprises the steps of providing a generally E-shaped high permeability ferrite core piece having a center leg and two outer legs disposed on opposite sides of said center leg, providing a primary winding on said center leg and a secondary winding having different portions on said outer legs and connected in series opposition, positioning an additional high permeability core piece in abutting engagement with the free ends of both said outer legs and spaced from the free end of said center leg by an air gap, positioning a flux barrier in said air gap to control the division of flux between said outer legs, energizing said primary winding, adjusting the position of said additional core piece laterally of said outer legs to substantially equalize eddy currents in said outer legs, and securing said additional core piece in said adjusted position.

References Cited in the file of this patent
UNITED STATES PATENTS

| | | |
|---|---|---|
| 2,064,771 | Vogt | Dec. 15, 1936 |
| 2,700,758 | Smith | Jan. 25, 1955 |
| 2,934,727 | Cornell | Apr. 26, 1960 |